(12) United States Patent
McCabe

(10) Patent No.: US 6,187,709 B1
(45) Date of Patent: *Feb. 13, 2001

(54) PALLADIUM CATALYST PRE-OXIDATION TO REDUCE LIGHT-OFF TEMPERATURE

(75) Inventor: Robert Walter McCabe, Lathrup Village, MI (US)

(73) Assignee: Ford Global Technologies, Inc., Dearborn, MI (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/550,476

(22) Filed: Oct. 30, 1995

(51) Int. Cl.[7] .................................................. B01J 20/34
(52) U.S. Cl. ............................. 502/52; 502/38; 423/213.5; 60/299
(58) Field of Search ........................... 423/213.5; 502/38, 502/49, 52

(56) References Cited

U.S. PATENT DOCUMENTS

| | | | |
|---|---|---|---|
| 3,662,540 | 5/1972 | Murphey ........................... | 423/213.2 |
| 3,771,921 | 11/1973 | Rohde et al. ..................... | 417/12 |
| 3,779,015 | 12/1973 | Maruoka .......................... | 60/286 |
| 3,862,540 | 1/1975 | Harvey ............................. | 60/290 |
| 3,896,616 | 7/1975 | Keith et al. ....................... | 423/213.7 |
| 3,943,709 | 3/1976 | Holt .................................. | 60/274 |
| 4,099,377 | 7/1978 | Yoshimura et al. .............. | 60/276 |
| 4,185,604 | 1/1980 | Nagaishi et al. ................. | 60/307 |
| 4,231,220 | 11/1980 | Takeda ............................. | 60/276 |
| 4,315,895 | 2/1982 | Bramer et al. .................... | 422/171 |
| 4,364,227 | 12/1982 | Yoshida et al. .................. | 60/276 |
| 4,437,306 | 3/1984 | Ikenoya et al. .................. | 60/293 |
| 4,484,441 | 11/1984 | Kobayashi et al . ............. | 60/285 |
| 4,893,465 | * 1/1990 | Farrauto et al. ................. | 502/38 |
| 4,916,898 | * 4/1990 | Gandhi et al. .................... | 60/274 |
| 5,106,588 | * 4/1992 | Sims et al. ....................... | 423/213.5 |
| 5,185,305 | * 2/1993 | Subramanian .................... | 423/213.5 |
| 5,234,881 | * 8/1993 | Narula et al. .................... | 423/213.5 |
| 5,345,761 | * 9/1994 | King et al. ....................... | 60/274 |

FOREIGN PATENT DOCUMENTS

| | | | |
|---|---|---|---|
| 57-132548 | * 8/1982 | (JP) ........................... | 502/38 |
| 1-227815 | 9/1989 | (JP) . | |

OTHER PUBLICATIONS

Z. Hu, et al. "Hight Temperature Ultra Stable Close–Coupled Catalysts" SAE Technical Paper Series No. 95024, presented Feb. 27, 1995–Mar. 2, 1995.*

Ball, D.J. "Warm–Up and Underfloor Parametric Study", SAE Technical Paper 932765 (1993), pp. 179–189.*

* cited by examiner

Primary Examiner—Steven P. Griffin
Assistant Examiner—Peter Di Mauro
(74) Attorney, Agent, or Firm—Lorraine S. Melotik

(57) ABSTRACT

The invention is a method for preconditioning a palladium containing automotive catalyst by subjecting the catalyst to oxidation by means of an oxidizing gas containing at least 0.85% oxygen at a temperature of at least 450° C. preferably for at least 15 seconds. This oxidation can be carried out before or after engine shutdown. The catalyst is placed in the exhaust system in a location whereby the catalyst attains this temperature during steady state warm-up operation of the engine.

9 Claims, 1 Drawing Sheet

PALLADIUM CATALYST PRE-OXIDATION TO REDUCE LIGHT-OFF TEMPERATURE

FIELD OF THE INVENTION

This invention is directed to a method of preconditioning automotive vehicle catalysts containing palladium to lower their light-off temperature during subsequent cold-starting of the automotive vehicle. More particularly, it involves oxidizing the catalyst at elevated temperatures.

BACKGROUND OF THE INVENTION

Future emission regulations expected to be implemented in both in the United States and Europe will require the automotive emission system to work with high efficiency within a very short time after cold-starting of the engine, perhaps within 20 seconds. In the automotive industry, a number of approaches are under investigation to achieve rapid emissions control after cold-starting. One approach involves electrically heating the automotive catalyst during cold starting, another involves the use of hydrocarbon adsorption traps in the exhaust system, and yet another the use of exhaust gas burners to rapidly boost the temperature of the exhaust gas. Highly loaded palladium (Pd) containing three-way catalysts which are close coupled to the engine are still another approach to achieve fast light-off. The term "three-way" refers to catalysts that are able to simultaneously convert hydrocarbons, carbon monoxide and nitrogen oxides present in automotive exhaust gases to more desirable species. This last approach shows promise for use either in conjunction with, or in lieu of, the more complicated technologies noted above. This new generation of highly loaded Pd-containing catalysts demonstrates both improved durability and light-off characteristics when compared to conventional platinum/rhodium three-way catalysts.

We have unexpectedly found a novel method of preconditioning Pd-containing three-way catalysts which significantly lowers their light-off temperature during a subsequent cold-starting, as tested in synthetic gas mixtures resembling engine exhaust gases. When this preconditioning method is applied to non-palladium three-way catalysts like platinum, a similar improvement in light-off temperature is not seen.

DISCLOSURE OF THE INVENTION

The invention is a method for preconditioning a highly loaded palladium-containing three-way automotive vehicle catalyst so as to lower its light-off temperature during subsequent cold-starting of the vehicle's engine. The method comprises the steps of providing the highly loaded palladium-containing three-way automotive catalyst (Pd loading of at least 100g/ft$^3$ on a catalyst support material) at a location in the exhaust system of the automotive vehicle where the steady-state warmed up operating temperatures of the system are at least 450° C., and subjecting the catalyst, either before or after shutdown of the vehicle's engine, to a flow of an oxidizing gas containing at least 0.85 volume % oxygen for a selected period of time, preferably of at least 15 seconds, while the catalyst is at an elevated temperature of at least 450° C. in order to oxidize the catalyst. Preferably, during cold starting of the engine it is operated in the lean-burn mode (such that the air/fuel ratio is greater than stoichiometric) in order to further reduce the light-off temperature of the preconditioned catalyst.

We have unexpectedly and advantageously found that by pre-oxidizing the catalyst as disclosed the light-off temperature can be lowered significantly when the engine is operated in a stoichiometric A/F ratio during subsequent cold-starting and can be lowered even further when the engine is operated in excess oxygen (lean-burn) during subsequent cold-starting.

DETAILED DESCRIPTION OF PREFERRED EMBODIMENTS

Figure 1:
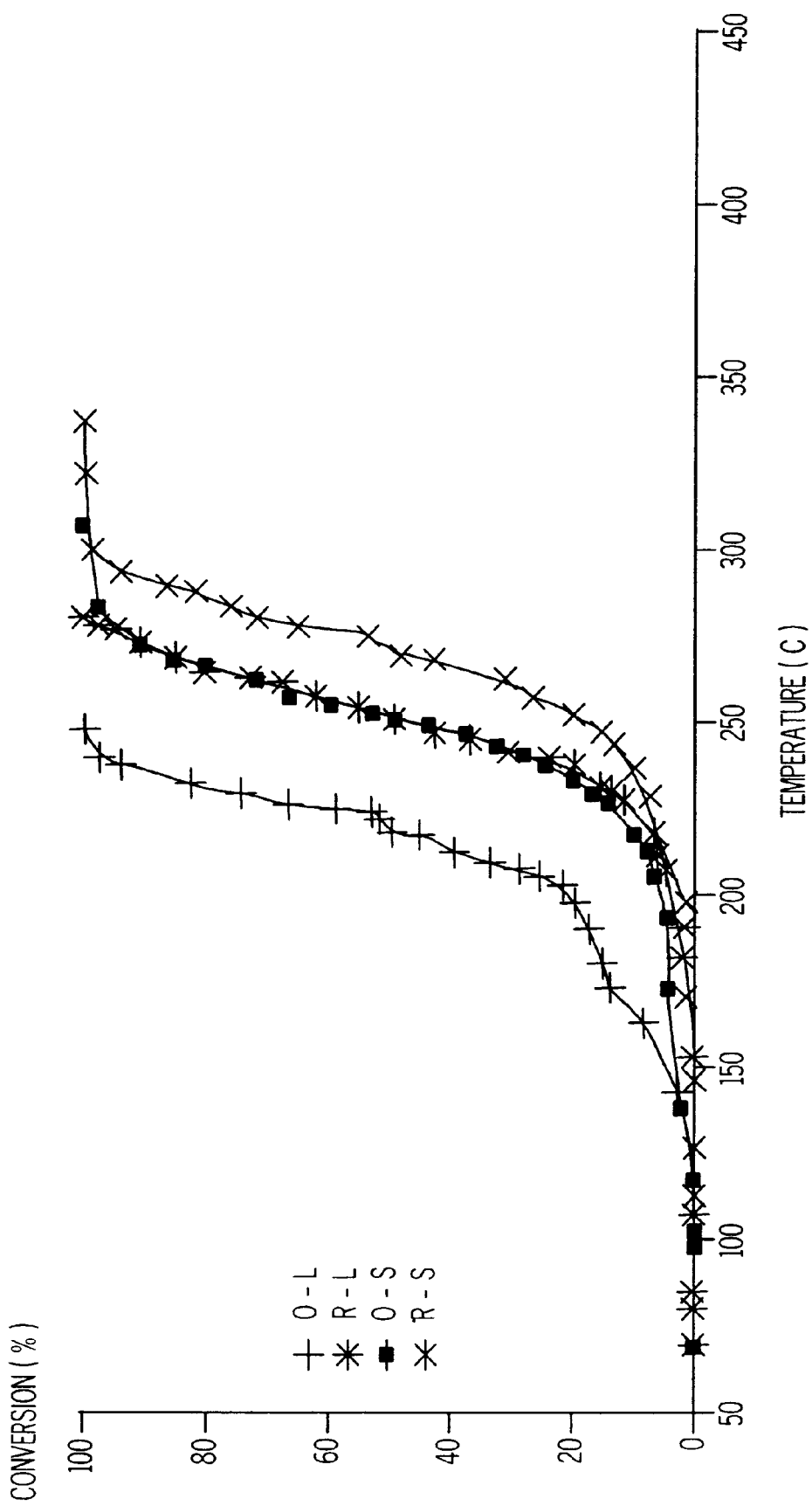
FIG. 1 is a graph which depicts the "light-off" curves. i e., % conversion of exhaust gas v. temperature, for various preconditioned catalysts, those designated O-L and O-S being preconditioned according to embodiments of the present oxidation method.

The invention as disclosed above is a method of preconditioning (oxidizing) a highly loaded palladium catalyst used in an automotive exhaust gas system in order to lower the light-off temperature of the catalyst during subsequent cold-starting of the engine. The "light-off temperature" is the temperature at which the catalyst is operational to convert 50% of the carbon monoxide, hydrocarbons and nitrogen oxides present in the exhaust gas generated during operation of the engine. We have found that by subjecting the catalyst to oxidizing conditions for a selected period of time, preferably of at least 15 seconds, at a temperature of at least 450° C., the light-off temperature is lowered. Hence, exhaust gas conversion by the catalyst during the subsequent cold-starting period is able to take place at a lower temperature. The exposure of the catalyst to the oxidizing gas may continue through all or part of the cool down of the catalyst to about 300° C. The inventors have found that by pre-oxidizing the highly loaded palladium catalyst for at least 15 seconds according to the method disclosed above, the catalyst's light-off temperature was generally lowered by about 20° C. when the subsequent cold start procedure was carried out under stoichiometric conditions ($\lambda=1$, where $\lambda$ is defined as the ratio of the actual A/F ratio to the stoichiometric A/F ratio). In the situations where the cold start procedure is carried out in a lean mode, i.e., at values of $\lambda$ greater than one and preferably between $\lambda=1.02-1.12$, a synergistic effect has been seen to take place between pre-oxidizing the catalyst and operating in this mode during cold-starting such that the light-off temperature of the catalyst can be lowered up to 80° C.

In the present invention method, the catalyst employed is a highly loaded palladium containing three-way catalyst. By this is meant that the catalyst contains at least 100 g/ft3 of palladium on a catalyst support. In addition to palladium, the catalyst may contain other metals like platinum or rhodium. The catalyst support (washcoat) material loaded with the catalysts is preferably a porous, high surface area washcoat material like alumina, preferably being nominally gamma-alumina with suitable stabilizers, additives and promoters required to obtain high performance after extended use in high-temperature exhaust environments. Still other washcoat materials which may be used at the high operation temperatures associated with an internal combustion engine exhaust system include but are not limited to, other transitional alumina phases, alpha-alumina, silica-alumina, zirconia, any or all in combination with various promoters, stabilizers, and/or additives such as cerium oxide, barium oxide, lanthanum oxide, zirconium oxide, calcium oxide, neodymium oxide, strontium oxide or many other oxide phases generally taken from the alkaline earth and lanthanide series of elements. Such washcoat materials, useful for carrying catalyst materials, are well known to those skilled in the art. The choice of the particular porous support (washcoat) material is not critical to this invention. Desirably, the support material has a surface area between about 5 and 300 $m^2/g$. A typical catalyst which may be used in the present invention is of the Pd-only type described in Society of Automotive Engineers Paper No. 941058 "Development of Pd-only Three Way Catalyst Technology," by J. S. Hepburn et al. Catalyst of the type useful herein may be obtained from catalyst supplies or made by methods well known to those skilled in the art. The method of preparation of the catalyst is not critical to the present invention.

For useful application in an exhaust system, the washcoat will be carried on a substrate of a high temperature stable material. Typical of such substrate materials are cordierite, mullite, etc., and also metallic substrates. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

According to the present method, the palladium catalyst is provided in the exhaust system of an automotive vehicle at a location in the system where the steady state warmed up operating temperatures are at least 450° C.; preferably at least 500° C. This is because we have found that the preconditioning (oxidizing) needs to be carried out at these elevated temperatures. Thus by placing the catalyst at this location no outside heat is required to bring the catalyst to this temperature required for preconditioning. In general, the catalyst can be preconditioned either prior to or after shutdown of the engine, i.e., (i) optimally immediately before shutdown of the engine or (ii) after shutdown of the engine. Preconditioning after shutdown is preferred because no constraints are placed on the operating modes of the engine prior to shutdown. To oxidize the catalyst, the catalyst is subjected to a flow of an oxidizing gas either before or after shutdown, while the catalyst is at a temperature of at least 450° C. over a selected period of time, generally over at least 15 seconds and preferably over at least 15–30 seconds. This temperature and time were found optimal to oxidize the catalyst and reduce the light-off temperature. Further benefits in reducing light-off temperature, however not as significant, have been seen by subjecting the preconditioned palladium catalyst to the oxidizing gas over a longer period of time and for at least a portion of the temperature range of 450° C.–300° C. At catalyst temperatures of 300° C. or lower, our research shows that no significant impact on reducing the light-off temperature took place.

This oxidizing gas contains at least 0.85 volume % oxygen, preferably at least 1 volume % oxygen. This oxidizing gas would generally be expected to be either air or mixtures of oxygen in relatively inert gases such as nitrogen, water vapor, and carbon dioxide. Ambient air is one source which may be used for the oxidizing gas as is "lean" engine exhaust. Preferably, for optimal pre-oxidizing of the catalyst, we have found that it is desirable that the oxidizing gas comprises a percentage of oxygen of 1% or more, which was found to provide enhanced lowering of the light-off temperature. Moreover, the oxidizing gas should not contain significant concentrations of reducing gases such as hydrogen, carbon monoxide, and hydrocarbons. To this end, when the preconditioning is carried out after engine shutdown, it is desirable to provide sufficient air to sweep any residual fuel, fuel vapors, or hydrocarbon vapors out of the exhaust system upstream of the catalyst.

Once preconditioned, there are no special conditions that need to be provided to the catalyst to preserve the catalyst in this active state prior to the subsequent cold-start and light-off. We have found no dependence of light-off performance on the amount of time spent by the preconditioned catalyst at ambient conditions prior to subsequent cold-start and light-off.

This method has been found by the inventors to not provide similar benefits to other precious metal catalysts like platinum and rhodium. While not wishing to be bound by theory, the inventors believe that palladium shows a lowering of the light-off temperature upon the high temperature oxidation of this method because of its ability to store oxygen in the form of palladium oxide. During subsequent light-off, this oxygen associated with the oxide reacts more readily with the exhaust gas pollutants carbon monoxide and hydrocarbons than oxygen present in the gaseous form, thereby lowering the light-off temperature. Neither the accuracy of this theory nor its understanding is however necessary for the practice of the invention method.

EXAMPLE 1

A commercial Pd-only automotive catalyst with a Pd loading of 110 g/f3 on (Engelhard, Corp., Edison. N.J.) was aged on an engine dynamometer employing a standard 4-mode aging cycle incorporating both lean, rich, and stoichiometric modes at temperatures up to 850C. for a period of 120 hours. This aging is generally accepted to represent the equivalent of 100,000 miles of typical aging on an actual vehicle. After aging, the catalyst brick was removed from the housing and a small core sample measuring 0.75 in. diameter by 0.5 in. length was removed from the from region of the brick near the radial centerline of the brick. The core sample was wrapped with a thin blanket of ceramic fiber and inserted into a quartz flow tube of 1 i. outside diameter. The flow tube was in turn positioned in a tube furnace (Lindberg Model 55035). The tube furnace was equipped with a built-in temperature controller operating off of a chromel-alumel K-type thermocouple located in the gap between the heating elements and the reactor tube. A second K-type thermocouple was mounted inside the reactor tube with its tip positioned approximately 1 millimeter behind the back face of the catalyst core.

Test gases were supplied to the flow tube via mass flow controllers. The main component of the reactor feed was nitrogen at a flow rate of 2.8 liters per minute. Carbon monoxide, hydrogen and oxygen were added to the nitrogen flow raising the total flow rate to about 3 liters per minute and resulting in a carbon monoxide concentration of 136% and a hydrogen concentration of 0.34%. The 3 liter per minute flow rate corresponded to a gas hourly space velocity of 60,000 where the space velocity is defined as the ratio of the volumetric gas flow rate at standard conditions of temperature and pressure to the volume of the catalyst sample (based on external dimensions).

The general procedure for carrying out the preoxidation experiments was as follows. The catalyst was first conditioned by treating the catalyst in a selected feedstream for 15 minutes. The composition of this feedstream always was chosen to match the composition selected for the subsequent light-off experiment. Thus, for example, in the case where it was desired to examine the effect of pre-oxidation on the stoichiometric light-off performance of the catalyst, the catalyst was first pretreated for 15 minutes in a stoichiometric feed containing 1.36% carbon monoxide, 0.34% hydrogen, and 0.85% oxygen. Then the flow of carbon monoxide and hydrogen was stopped and the catalyst was cooled in the remaining nitrogen and oxygen flow to 300 C. at which point the oxygen flow was stopped and the catalyst was cooled to 50 C. or less in nitrogen only. Once the catalyst reached 50 C. all of the gas flows were restarted at the same concentrations as during the pretreatment and the furnace was simultaneously turned back on and allowed to heat up to 500 C. while concentrations of the reacting gases were measured.

The procedure described above is designated O-S since the pre-conditioning was carried out in an oxidizing gas, oxygen, (i.e. cooling in oxygen only, nitrogen being inert) and the subsequent light-off experiment was carried out in a stoichiometric mixture. The light-off curve thus obtained is shown in FIG. 1 by the filled solid squares. In addition to the O-S case, three additional experiments were run, designated respectively as O-L (oxidizing pre-conditioning—lean light-off), R-L (reducing preconditioning—lean light-off), and R-S (reducing preconditioning—stoichiometric light-off). The reducing experiments are for comparison and are not examples according to embodiments of the oxidizing pre-conditioning method of this invention. In these cases, lean light-off (L) is that carried out with excess oxygen, i.e. 1.35% oxygen, or 0.5% above the stoichiometric oxygen concentration of 0.85%. Reducing preconditioning (R) refers to cooling carried out in carbon monoxide and hydrogen only. Light-off curves for the O-L, R-L, and R-S cases are also shown in FIG. 1.

Light-off comparisons are summarized in Table 1 which lists temperatures of 50% CO conversion. In the stoichiometric light-off experiments (O-S and R-S), preoxidation of the catalyst resulted in a 20° C. decrease in light-off temperature relative to the prereduced catalyst (T(50)=254C for O-S vs 274C. for R-S). Similarly, in the lean light-off experiments (O-L and R-L), preoxidation of the catalyst resulted in a 30° C. decrease in light-off temperature relative to the prereduced catalyst (T(50)=222C. for O-L vs 252C. for R-L). Also evident in both FIG. 1 and in Table 1, is that light-off occurs at lower temperatures in the lean feed compared to the stoichiometric feed. Moreover, the effects of preoxidation and lean light-off are additive, and to some extent, synergistic. The preoxidized catalyst in the lean feed lights off at 222° C. compared to 274° C. for the prereduced catalyst in the stoichiometric feed. The 52 degree decrease in light-off temperature can be roughly broken down into 20 degrees for the oxidizing vs reducing pretreatment (i.e. O-S vs. R-S) and 32 degrees for the lean vs. stoichiometric light-off(O-L vs. O-S). Note, however, that the 32 degree decrease in light-off temperature is only obtained after preoxidation; hence, the synergy between preoxidation and lean light-off.

TABLE 1

Comparison of Light-off Temperature of Pd-only and Pt/Rh catalysts.

| Treatment | Light-off Temperature (° C.) (50% Conversion) | |
|---|---|---|
| | Pd-only Catalyst | Pt/Rh Catalyst |
| O-L | 222 | 318 |
| R-L | 252 | 318 |
| O-S | 254 | 343 |
| R-S | 274 | 350 |

EXAMPLE 2

Experiments of the type described in Example 1 were exactly duplicated except with a comparative catalyst (not according to the invention) comprised of platinum and rhodium at a weight ratio of 5 to 1 and a total noble metal loading of 40 g/ft3 on a standard 400 cell per square inch cordierite honeycomb substrate. The commercial Pt/Rh catalyst sample was aged in exactly equivalent fashion to the catalyst of Example 1 prior to evaluation. The light-off results for the Pt/Rh catalyst under the various pretreatment and light-off conditions are shown in Table 1.

The only difference between the Pt/Rh catalyst test cases is a downward shift of 25–32° C. in going from stoichiometric to lean light-off conditions, irrespective of catalyst pretreatment. Light-off temperatures for the Pt/Rh catalyst are summarized in Table 1 along with the data for the Pd-only catalyst. In addition to the absence of an effect of pretreatment on the Pt/Rh catalyst the other striking difference between Pt/Rh and Pd-only is that the light-off temperatures are higher by about 65–95° C. for Pt/Rh compared to Pd-only.

EXAMPLE 3

In Examples 1 and 2, the catalysts were preoxidized or prereduced by cooling from a starting temperature of 500C. In the present Example, the effect of preoxidizing by cooling from 300C. was examined for the Pd-only catalyst (same catalyst as employed in Example 1). Results comparing light-off data after 300C. and 500C. preoxidation are summarized in Table 2. In the case of the 300° C. preoxidation, the catalyst was first conditioned as usual at 500° C. in the stoichiometric feed, but then cooled to 300° C. in the stoichiometric feed prior to removing the CO and $H_2$ and cooling to 50° C. in $O_2/N_2$. Table 2 shows no light-off benefit of pretreating the catalyst in $O_2$ at 300° C. Temperatures of 50% CO conversion were roughly 35–40 degrees higher after pretreating in $O_2$ at 300° C. than at 500° C. In addition, pretreatment in $O_2$ at 300° C. resulted in higher 50% conversion temperatures than pretreatment in $CO/H_2$ at 500° C. as can be seen by comparing the 300° C. O-L and O-S data of Table 2 with the 500° C. Pd-only R-L and R-S data of Table 1. These observations support the interpretation that bulk oxidation of Pd is responsible for the reductions in light-off temperature observed after preconditioning in $O_2$ at temperatures near 500° C. Consistent with reported kinetics of Pd oxidation [J. T. Remillard, W. H. Weber, J. R. McBride, and R. E. Soltis, J. Appl. Phys.vol. 71 (1992) 4515], the ability to oxidize Pd at the oxygen partial pressures and times employed in our experiments is lost somewhere in the temperature range between 500 and 300° C.

TABLE 2

Effect of Preoxidation Temperature on Light-off of Pd-only Catalyst.

| | Light-off Temperature (° C.) | |
|---|---|---|
| Treatment | Preoxidation @ 300° C. | Preoxidation @ 500° C. |
| O-L | 261 | 222 |
| O-S | 287 | 254 |

EXAMPLE 4

Sulfur dioxide (SO2) is formed in automobile exhaust during the combustion of fuel containing typically 50–1000 ppm by weight of sulfur. The amount of sulfur in gasoline depends on both the amount of sulfur in the petroleum feedstocks from which the gasoline is derived and the extent of refining the feedstocks are subjected to in the process of making gasoline. The SO2 formed during combustion acts as a poison of noble metal automotive catalysts, typically increasing the temperature required to obtain light-off.

To determine the impact of SO2 on the effectiveness of the preoxidation procedure described herein, additional experiments were carried out on the Pd-only catalyst of Example 1 comparing light-off temperatures after various preoxidation procedures in either the presence or absence of 20 vol. ppm of SO2 in the reactor feed. Note that 20 vol. ppm in our experiment is roughly equivalent to automotive exhaust derived from fuel containing 300 wt. ppm sulfur, which is close to the industry-average level.

$SO_2$ was included in the feed during the 15 minute conditioning at 500° C. prior to each experiment. However, it was removed from the feed during the cool down from 500–50° C. in either oxidizing or reducing gases, the rationale being that a catalyst on a vehicle would not continue to be exposed to $SO_2$ during the cool down period following engine shut-off. $SO_2$ was then added back into the feed during the light-off experiment.

Table 3 shows the results of the experiments carried out with $SO_2$ during catalyst preconditioning and light-off. As shown in Table 3. the presence of $SO_2$ results in a 40–50° C. increase in light-off temperature for all cases examined. However, the overall effect of catalyst preoxidation and lean light-off is roughly the same with or without $SO_2$. Thus the decrease of 79° C. between the R-S (274° C.) and O-L-I (195° C.) cases without $SO_2$ is almost identical to the 78° C. decrease between the R-S (324° C.) and O-L-I (246° C.) cases with $SO_2$. Note that in this example a new pretreatment procedure was utilized, designated O-L-I, which involves even leaner preoxidation and subsequent light-off than in the O-L case. Thus while the oxygen concentration was 1.35% in the O-L case, it was increased to 1.75% for the O-L-I case (carbon monoxide and hydrogen being held the same for the two cases.

TABLE 3

Effect of Oxygen Concentration on Light-off of Pd-only Catalyst (with and without $SO_2$).

| Treatment | Light-off Temperature (° C.) | |
| --- | --- | --- |
| | without $SO_2$ | with $SO_2$ |
| O-L-I | 195 | 246 |
| O-L | 222 | 262 |
| O-S | 254 | — |
| R-S | 274 | 324 |

I claim:

1. A method for lowering the light-off temperature of a highly loaded palladium-containing three-way automotive vehicle catalyst during cold-starting of the vehicle engine, which method comprises the steps of:

providing said palladium-containing catalyst comprising at least 100 g palladium/ft$^3$ catalyst support material as the only catalyst in the exhaust system of an automotive vehicle at a location where the steady state warmed up operating temperatures of said system are at least 450° C., and subjecting said catalyst, after shutdown of said engine, to a flow of an oxidizing gas containing at least 0.85 volume % oxygen for a selected period of time while said catalyst is at an elevated temperature of at least 450° C. in order to oxidize said catalyst, whereby the light-off temperature of the palladium-containing catalyst is lowered.

2. The method according to claim 1 wherein said selected period of time is at least 15 seconds.

3. The method according to claim 2 where said selected period of time is between 15 and 30 seconds.

4. The method according to claim 1 wherein said catalyst is further subjected to said oxidizing gas over at least a part of the temperature range of 450° C. and about 300° C.

5. The method according to claim 1 wherein said oxidizing gas is ambient air.

6. The method according to claim 1 wherein said oxygen comprises at least about 1 volume % of said oxidizing gas.

7. The method according to claim 1 wherein said support materials comprises gamma-alumina.

8. The method according to claim 1 wherein said method comprises the further step of cold starting of said engine after pre-conditioning of said catalyst using an air/fuel ratio which contains oxygen in excess of that required for stoichiometric engine operation.

9. The method according to claim 1 where said palladium containing catalyst further includes the metals selected from the group consisting of platinum and rhodium.

\* \* \* \* \*